United States Patent
Anand et al.

(10) Patent No.: US 11,250,477 B1
(45) Date of Patent: Feb. 15, 2022

(54) METHOD, SYSTEM, AND APPARATUS FOR PROGRAMMATICALLY DETERMINING AND ADJUSTING ELECTRONIC BID VALUES FOR A DIGITAL CONTENT OBJECT BASED ON CONVERSION RATES

(71) Applicant: Groupon, Inc., Chicago, IL (US)

(72) Inventors: Rahul Anand, Sunnyvale, CA (US); Sandeep Dey, Bellevue, WA (US); Pravin P. Thampi, Kirkland, WA (US); Zhi Guo, Sammamish, WA (US)

(73) Assignee: Groupon, Inc., Chicago, IL (US)

( * ) Notice: Subject to any disclaimer, the term of this patent is extended or adjusted under 35 U.S.C. 154(b) by 320 days.

(21) Appl. No.: 16/228,532

(22) Filed: Dec. 20, 2018

Related U.S. Application Data

(60) Provisional application No. 62/608,409, filed on Dec. 20, 2017.

(51) Int. Cl.
*G06Q 30/02* (2012.01)
*G06Q 30/08* (2012.01)

(52) U.S. Cl.
CPC ..... *G06Q 30/0275* (2013.01); *G06Q 30/0277* (2013.01); *G06Q 30/08* (2013.01)

(58) Field of Classification Search
CPC . G06Q 30/0275; G06Q 30/0277; G06Q 30/08
See application file for complete search history.

(56) References Cited

U.S. PATENT DOCUMENTS

| | | | |
|---|---|---|---|
| 6,059,733 A | 5/2000 | Brune et al. | |
| 8,682,721 B1* | 3/2014 | Kent | G06Q 30/08 705/14.43 |
| 10,036,219 B1 | 7/2018 | Sinn et al. | |
| 10,497,010 B1* | 12/2019 | Zhang | G06Q 30/0249 |
| 2006/0265429 A1 | 11/2006 | Pendergast et al. | |
| 2007/0027760 A1* | 2/2007 | Collins | G06Q 30/02 705/14.54 |
| 2013/0191213 A1 | 7/2013 | Beck et al. | |
| 2018/0308025 A1* | 10/2018 | Bansal | G06N 20/20 |

OTHER PUBLICATIONS

Evert de Haan, Thorsten Wiesel, Koen Pauwels, The effectiveness of different forms of online advertising for purchase conversion in a multiple-channel attribution framework, IJRM, vol. 33, Issue 3,2016, pp. 491507,https://doi.org/10.1016/j.ijresmar.2015.12.001. (Year: 2016).*

* cited by examiner

*Primary Examiner* — Katherine Kolosowski-Gager
(74) *Attorney, Agent, or Firm* — Alston & Bird LLP

(57) ABSTRACT

Embodiments of the present disclosure provide methods, systems, and apparatuses for programmatically determining and adjusting electronic bid values for a digital content object based on different conversion rates during different network time periods.

21 Claims, 10 Drawing Sheets

METHOD, SYSTEM, AND APPARATUS FOR PROGRAMMATICALLY DETERMINING AND ADJUSTING ELECTRONIC BID VALUES FOR A DIGITAL CONTENT OBJECT BASED ON CONVERSION RATES

CROSS-REFERENCE TO RELATED APPLICATIONS

The present application claims priority to U.S. Provisional Application Ser. No. 62/608,409, titled "METHOD, SYSTEM, AND APPARATUS FOR PROGRAMMATICALLY DETERMINING AND ADJUSTING ELECTRONIC BID VALUES FOR A DIGITAL CONTENT OBJECT BASED ON CONVERSION RATES," filed Dec. 20, 2017, the contents of which are incorporated herein by reference in their entirety.

BACKGROUND

Selecting electronic bid values for digital content objects so as to improve placement of associated electronic advertisements requires a multitude of considerations. Through applied effort, ingenuity, and innovation, many of these identified problems have been solved by developing solutions that are included in embodiments of the present disclosure, many examples of which are described in detail herein.

BRIEF SUMMARY

This specification relates to method, system, and apparatus for programmatically determining and adjusting electronic bid values for a digital content object based on different conversion rates during different time periods. In embodiments, a computing entity or apparatus is configured to receive, from a plurality of client devices, a plurality of transaction signals associated with a plurality of device rendered objects, where the plurality of device rendered objects are associated with the digital content object. The apparatus is further configured to receive, from the plurality of client devices, a plurality of device rendered object interaction signals associated with the plurality of device rendered objects.

The apparatus is further configured to programmatically generate a first set of conversion rates. In embodiments, each conversion rate of the first set of conversion rates is associated with a different one of the plurality of network time period segments within a first network time period. In embodiments, each conversion rate of the first set of conversion rates is programmatically generated based on dividing a total number of the plurality of transaction signals by a total number of the plurality of device rendered object interaction signals received during each of the plurality of network time period segments within the first network time period.

The apparatus is further configured to programmatically generate a second set of conversion rates. In embodiments, each conversion rate of the second set of conversion rates is associated with a different one of the plurality of network time period segments within a second network time period. In embodiments, each conversion rate of the second set of conversion rates is programmatically generated based on dividing a total number of the plurality of transaction signals by a total number of the plurality of device rendered object interaction signals received during each of the plurality of network time period segments within the second network time period.

The apparatus is further configured to programmatically generate an averaged conversion rate for each of the plurality of network time period segments based on averaging the first set of conversion rates for each of the plurality of network time period segments within the first network time period and the second set of conversion rates for each of the plurality of network time period segments within the second network time period.

The apparatus is further configured to programmatically generate a multiplier value based on the averaged conversion rate for each of the plurality of network time period segments, where the multiplier value is associated with a particular network time period segment of the plurality of network time period segments and indicates a conversion performance assessment of the digital content object during the particular network time period segment.

The apparatus is further configured to programmatically adjust the electronic bid value of the digital content object during the particular network time period segment based at least on the multiplier value.

In embodiments, each of the plurality of network time periods is divided equally by the plurality of network time period segments, where a subset of the plurality of network time period segments is associated with a day time period and another subset of the plurality of network time period segments is associated with a night time period.

In embodiments, the day time period and the night time period is determined based on geolocation data associated with the plurality of device rendered objects.

In embodiments, the apparatus is additionally configured to programmatically generate a first day time conversion rate associated with the subset of the plurality of network time period segments. In embodiments, the first day time conversion rate is programmatically generated based on dividing a total number of the plurality of transaction signals by a total number of the plurality of device rendered object interaction signals received during the day time period within the first network time period.

The apparatus is further configured to programmatically generate a second day time conversion rate associated with the subset of the plurality of network time period segments. In embodiments, the second day time conversion rate is programmatically generated based on dividing a total number of the plurality of transaction signals by a total number of the plurality of device rendered object interaction signals received during the day time period within the second network time period.

The apparatus is further configured to programmatically generate a day time averaged conversion rate for the day time period based on averaging the first day time conversion rate and the second day time conversion rate.

The apparatus is further configured to programmatically generate a first network time period conversion rate based on dividing a total number of the plurality of transaction signals by a total number of the plurality of device rendered object interaction signals received within the first network time period.

The apparatus is further configured to programmatically generate a second network time period conversion rate based on dividing a total number of the plurality of transaction signals by a total number of the plurality of device rendered object interaction signals received within the second network time period.

The apparatus is further configured to programmatically generate a network time period averaged conversion rate based on averaging the first network time period conversion rate and the second network time period conversion rate.

The apparatus is further configured to programmatically generate a day time multiplier value based on the day time averaged conversion rate and the network time period averaged conversion rate. In embodiments, the day time multiplier value is associated with the day time period and indicates a conversion performance assessment of the digital content object during the day time period.

The apparatus is further configured to programmatically adjust the electronic bid value of the digital content object during the day time period based at least on the day time multiplier value.

In embodiments, the apparatus is further configured to programmatically generate the day time multiplier value based on dividing the day time averaged conversion rate by the network time period averaged conversion rate. In circumstances where the day time multiplier value is larger than 1.5, the apparatus is further configured to programmatically adjust the day time multiplier value to be 1.5. In circumstances where the day time multiplier value is smaller than 0.5, the apparatus is further configured to programmatically adjust the day time multiplier value to be 0.5.

In embodiments, the apparatus is additionally configured to programmatically generate a first night time conversion rate associated with another subset of the plurality of network time period segments. In embodiments, the first night time conversion rate is programmatically generated based on dividing a total number of the plurality of transaction signals by a total number of the plurality of device rendered object interaction signals received during the night time period within the first network time period.

The apparatus is further configured to programmatically generate a second night time conversion rate associated with another subset of the plurality of network time period segments. In embodiments, the second night time conversion rate is programmatically generated based on dividing a total number of the plurality of transaction signals by a total number of the plurality of device rendered object interaction signals received during the night time period within the second network time period.

The apparatus is further configured to generate a night time averaged conversion rate for the night time period based on averaging the first night time conversion rate and the second night time conversion rate.

The apparatus is further configured to programmatically generate a night time multiplier value based on the night time averaged conversion rate and the network time period averaged conversion rate. In embodiments, the night time multiplier value is associated with the night time period and indicates a conversion performance assessment of the digital content object during the night time period.

The apparatus is further configured to programmatically adjust the electronic bid value of the digital content object during the night time period based at least on the night time multiplier value.

In embodiments, the apparatus is further configured to programmatically generate the night time multiplier value based on dividing the night time averaged conversion rate by the network time period averaged conversion rate. In circumstances where the night time multiplier value is larger than 1.5, the apparatus is further configured to programmatically adjust the night time multiplier value to be 1.5. In circumstances where the night time multiplier value is smaller than 0.5, the apparatus is further configured to programmatically adjust the night time multiplier value to be 0.5.

In embodiments, the apparatus is additionally configured to determine a new day time electronic bid value for the digital content object during the day time period by multiplying an existing day time electronic bid value for the digital content object by the day time multiplier value. The apparatus is further configured to determine a new night time electronic bid value for the digital content object during the night time period by multiplying an existing night time electronic bid value for the digital content object by the night time multiplier value.

Other embodiments include corresponding systems, methods, and computer programs, configured to perform the operations of the apparatus, encoded on computer storage devices.

Other embodiments can each optionally include a digital content object, where the digital content object is a keyword.

Other embodiments can each optionally include a plurality of network time periods, where each of the plurality of network time periods is associated with a start timestamp and a finish timestamp. In such embodiments, each embodiment can optionally include a time period, where the time period between the start timestamp and the finish timestamp is a 24-hour period.

Other embodiment can each optionally include a plurality of network time period segments, where each of the plurality of network time period segments dividing the plurality of network time periods is a 1-hour period.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
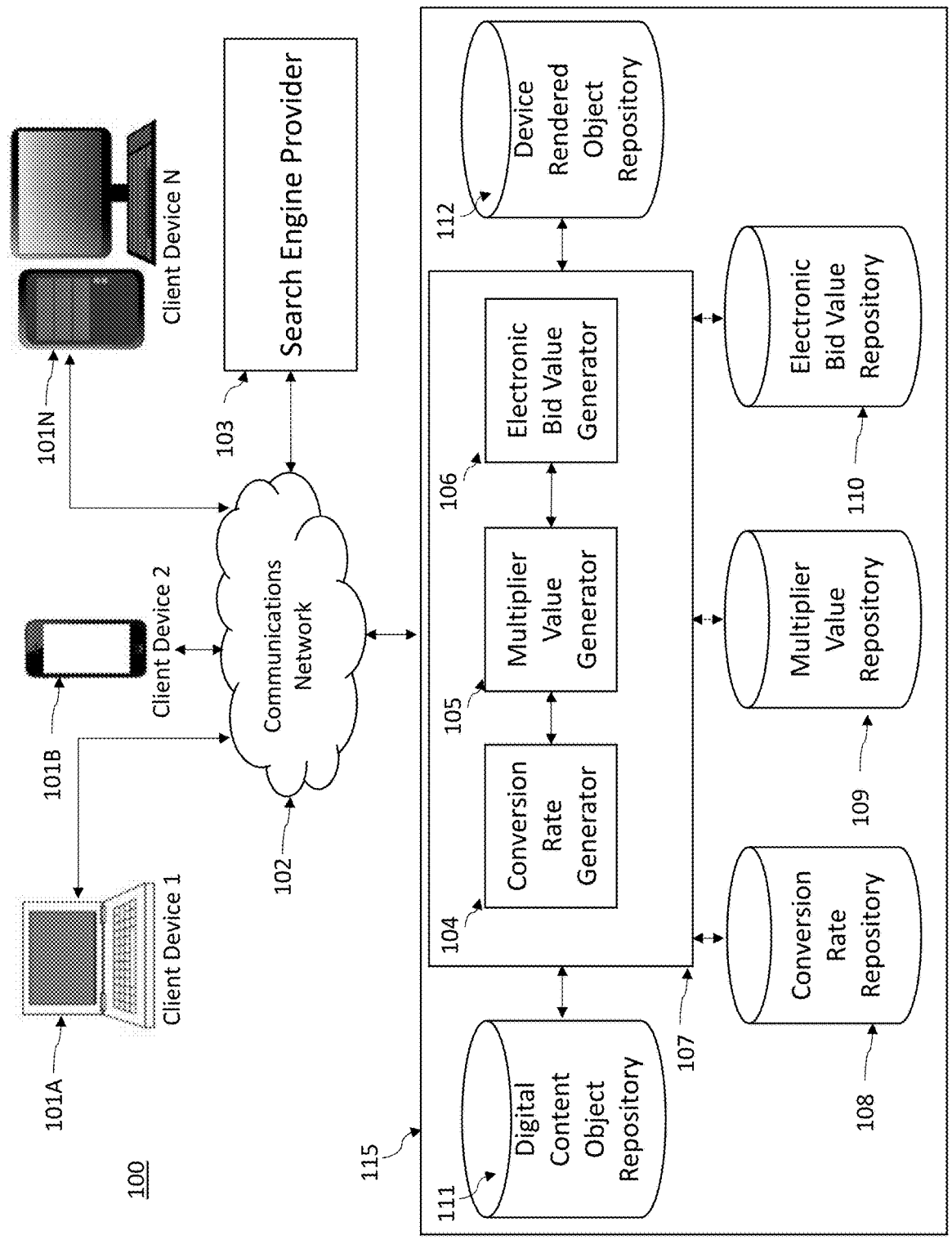
Figure 2:
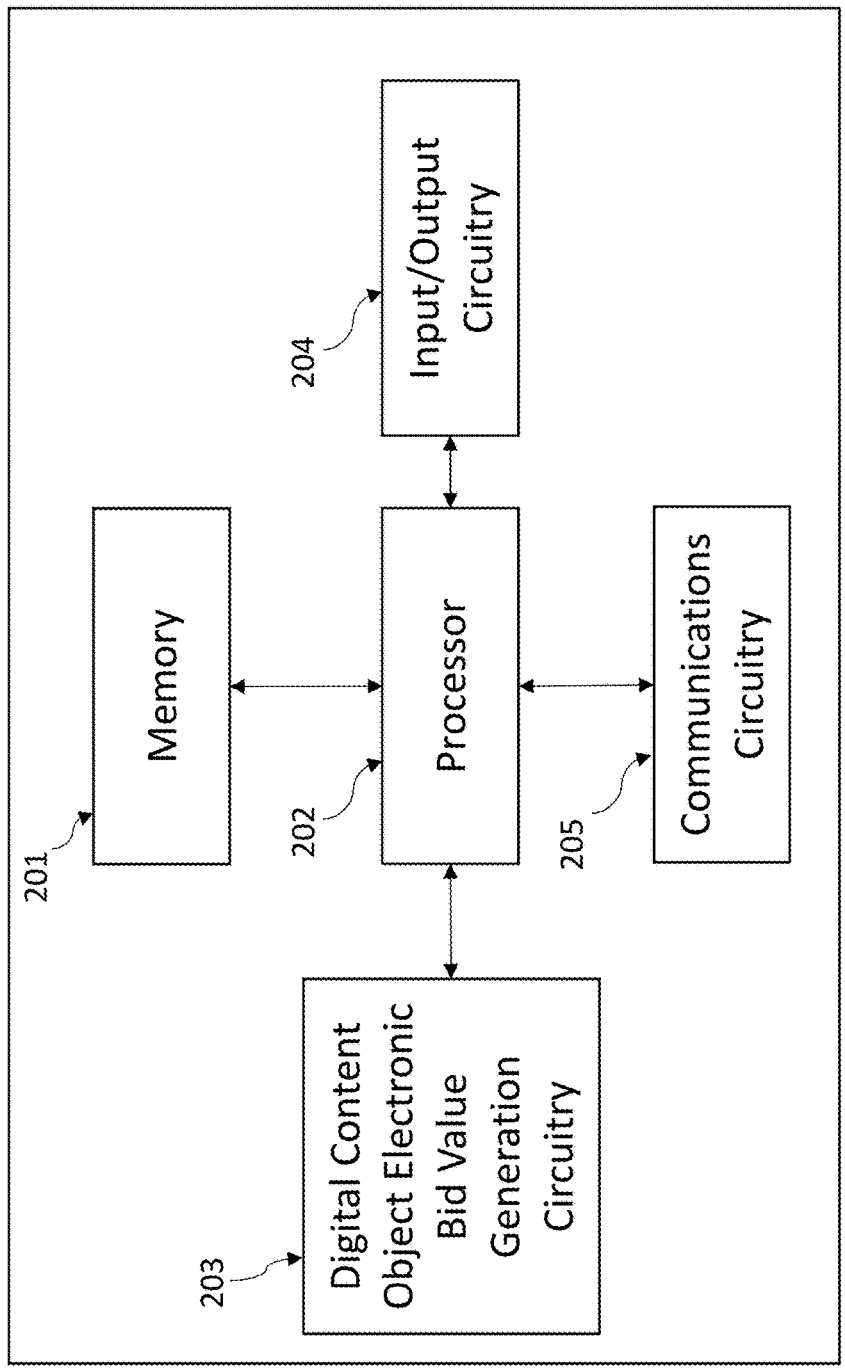
Figure 3:
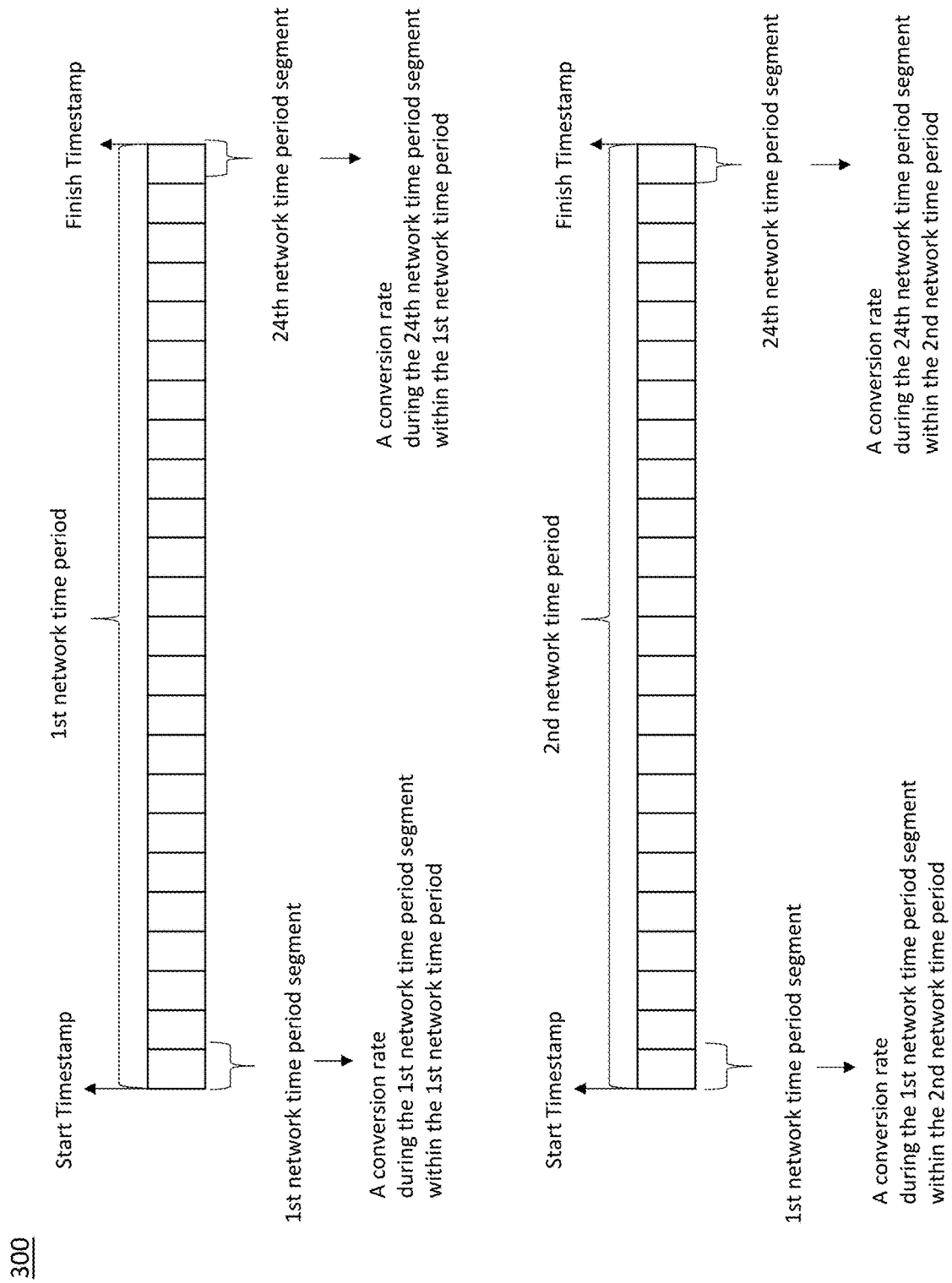
Figure 4:
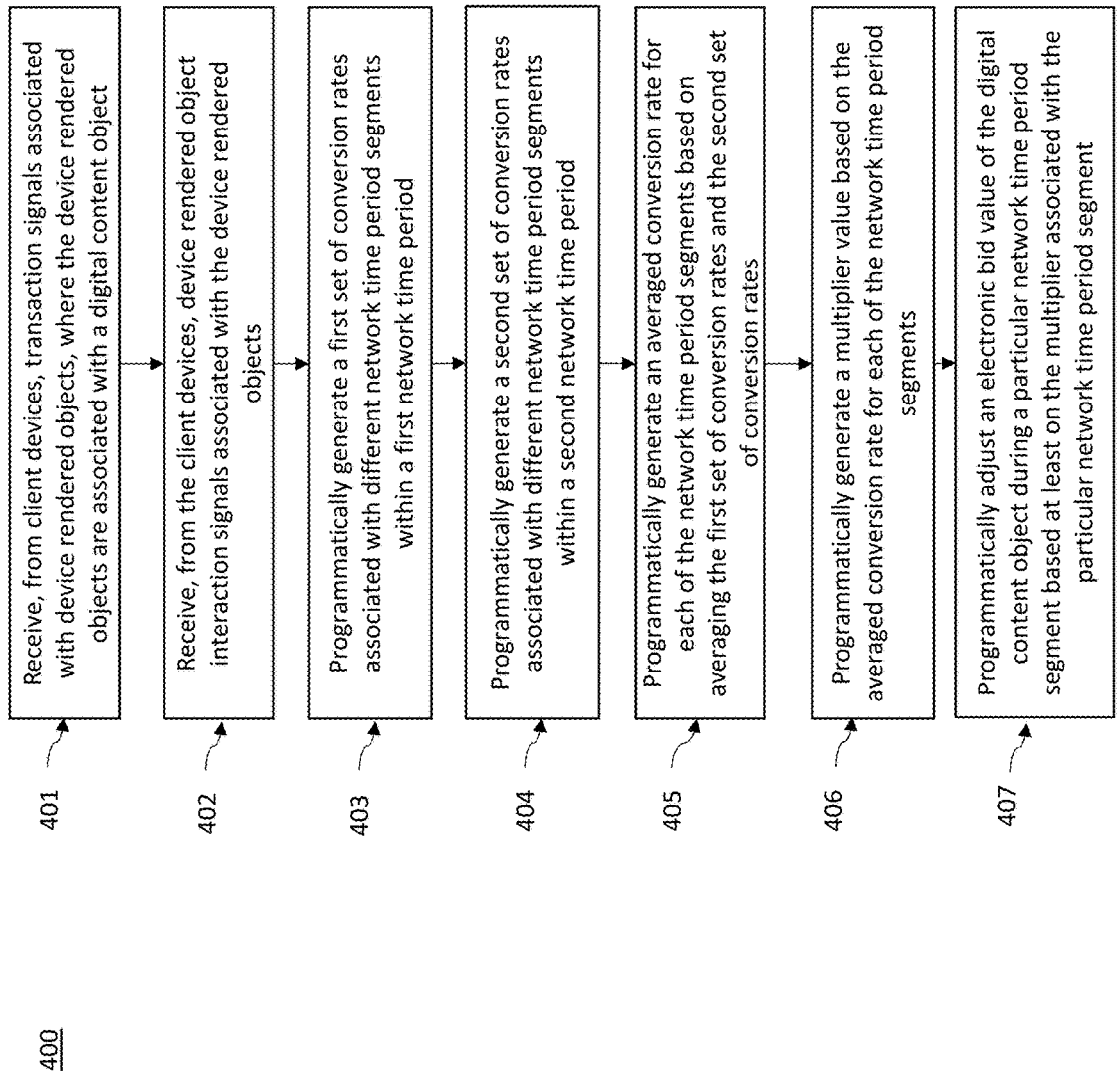
Figure 5:
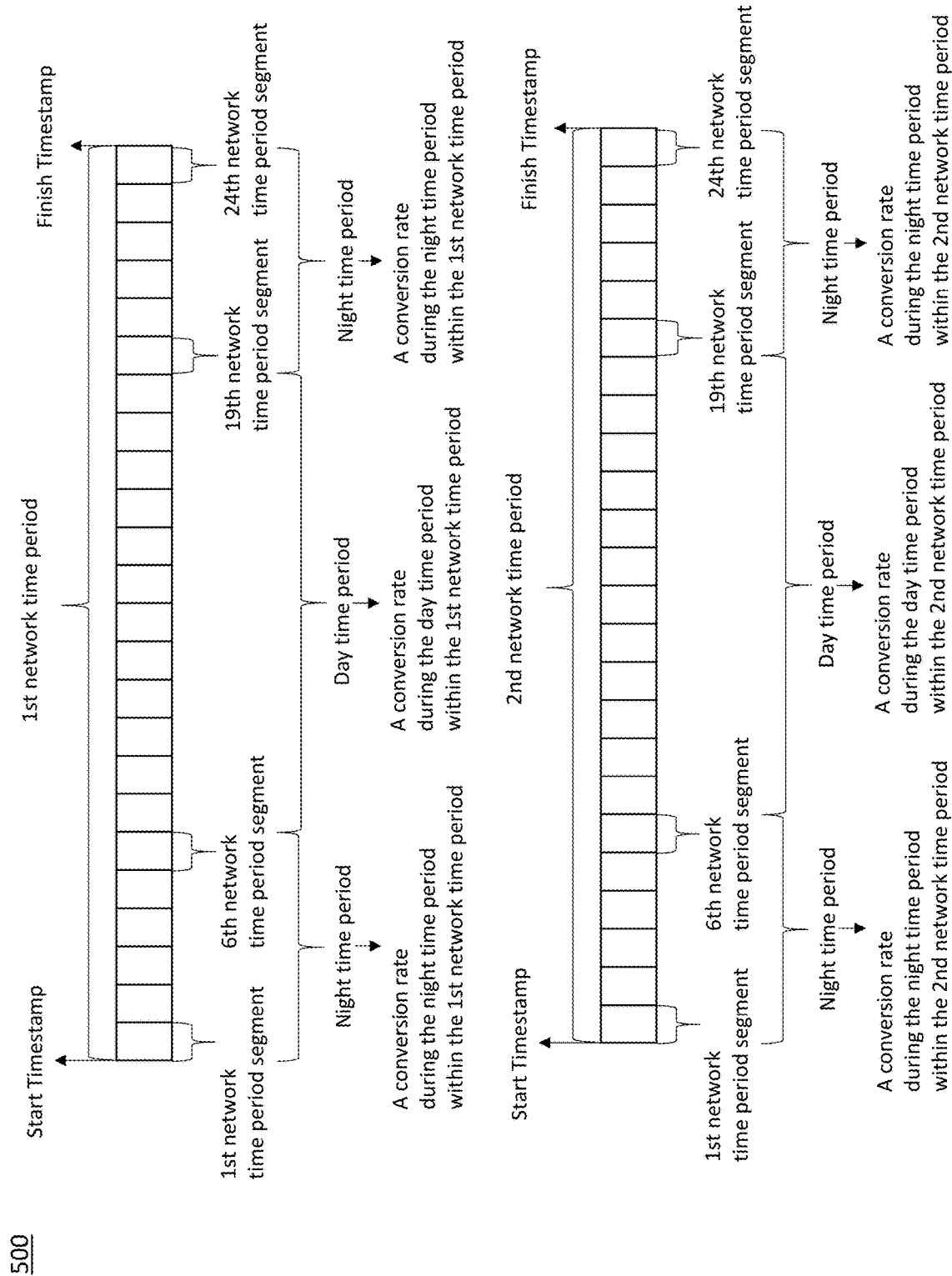
Figure 6:
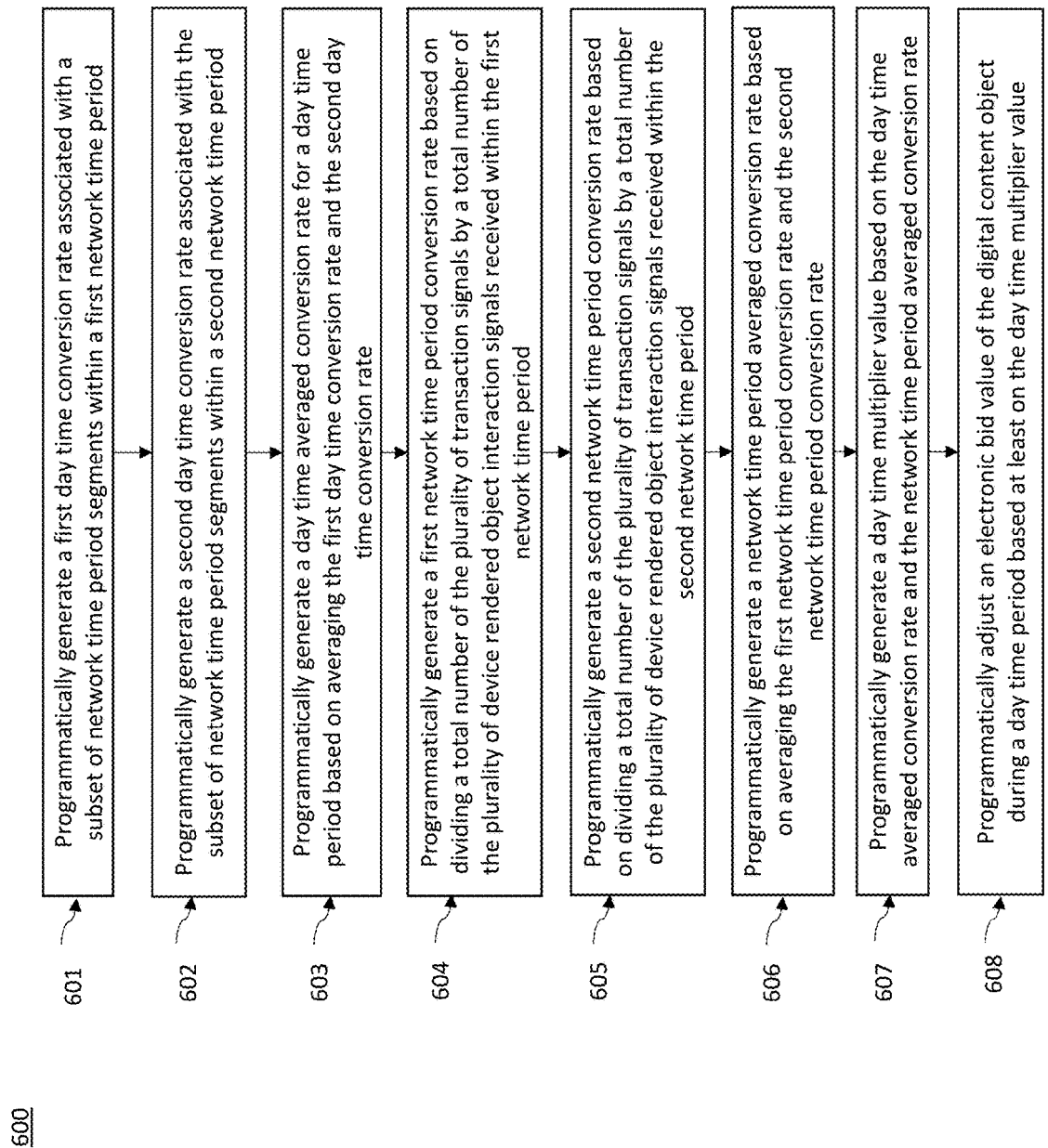
Figure 7:
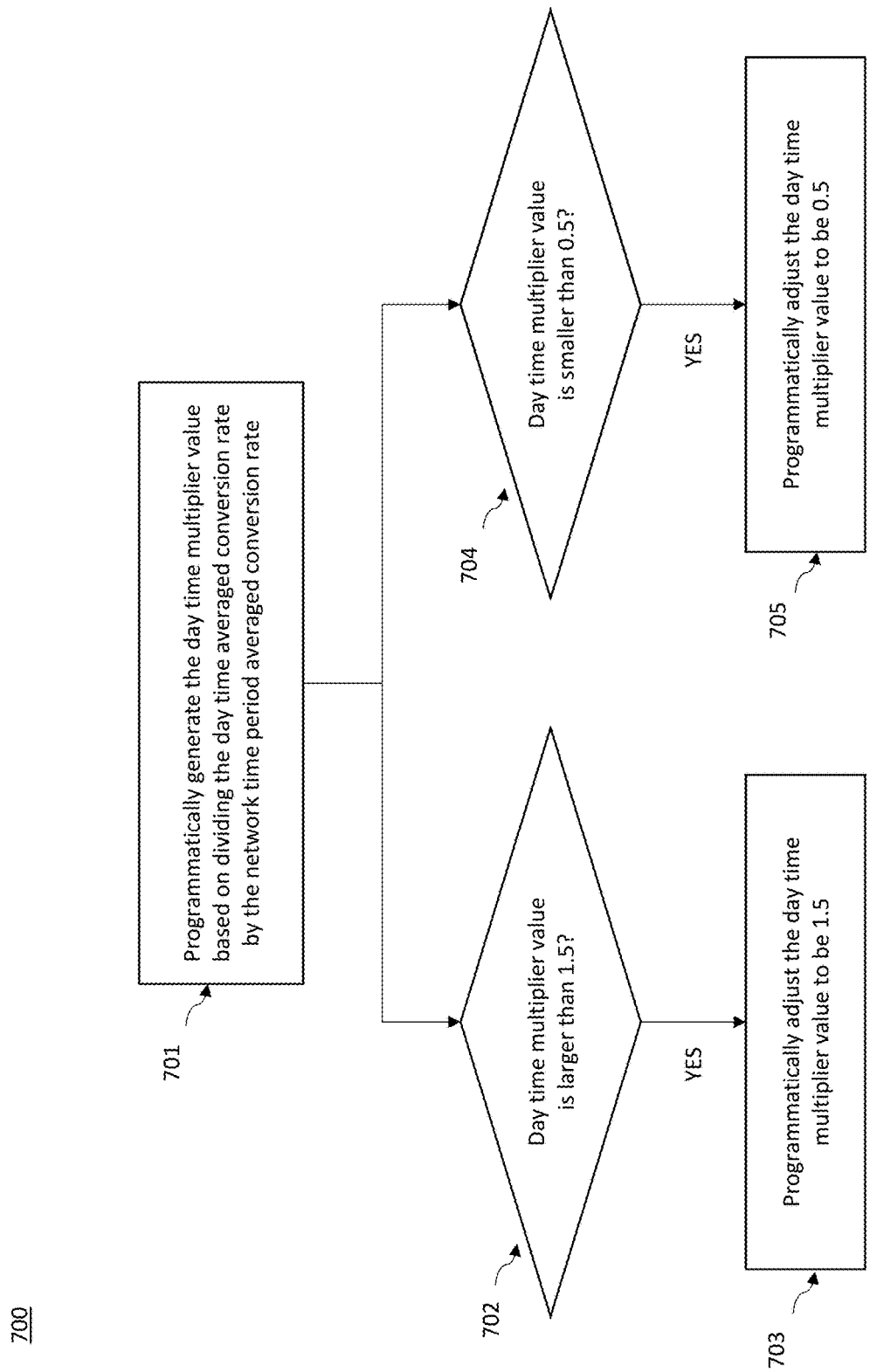
Figure 8:
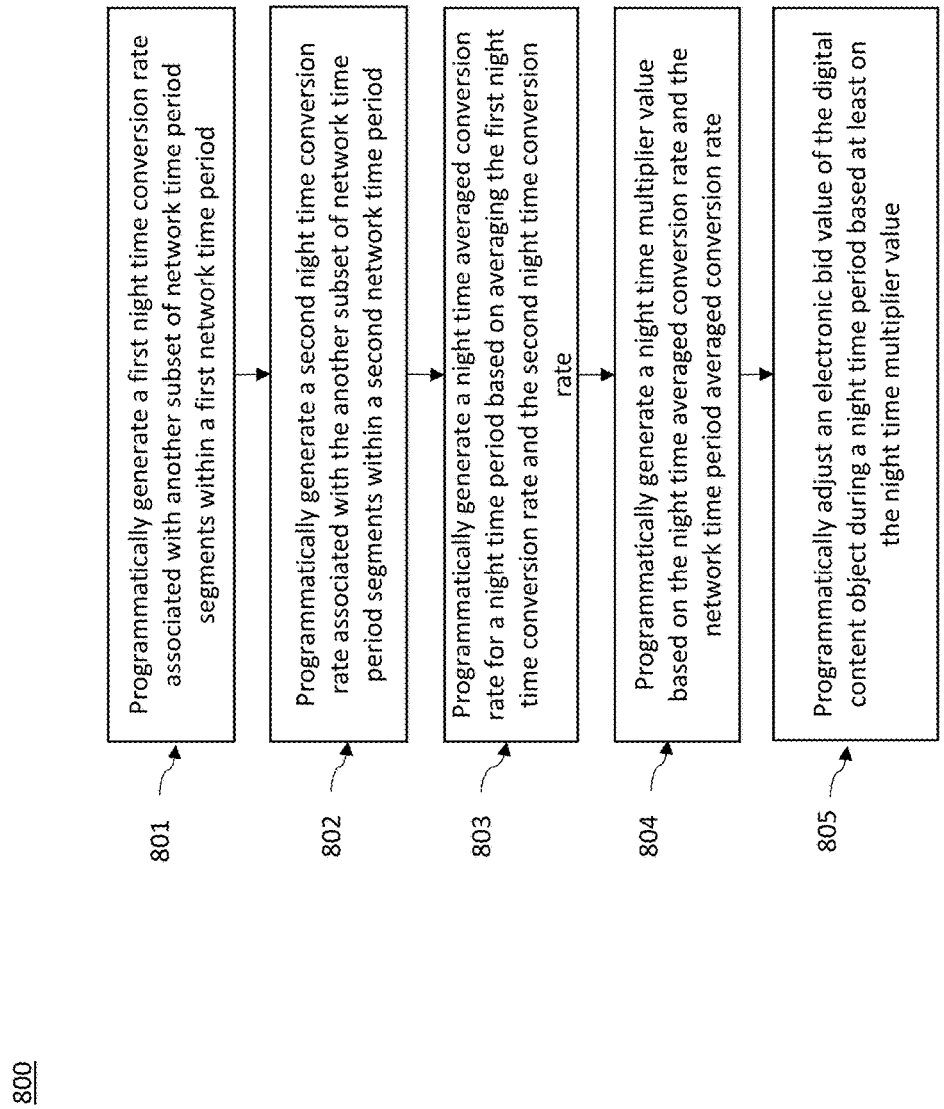
Figure 9:
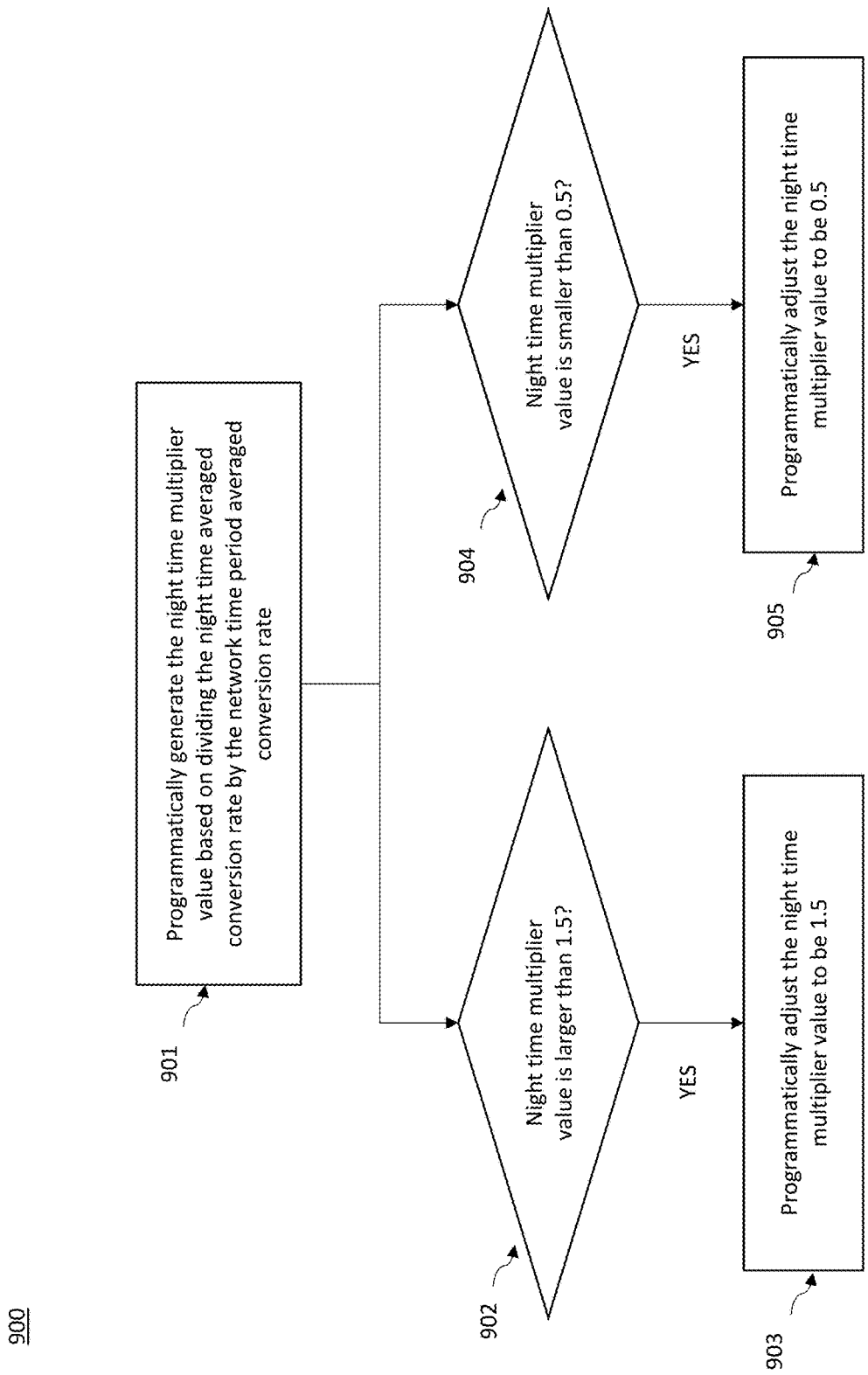
Figure 10:
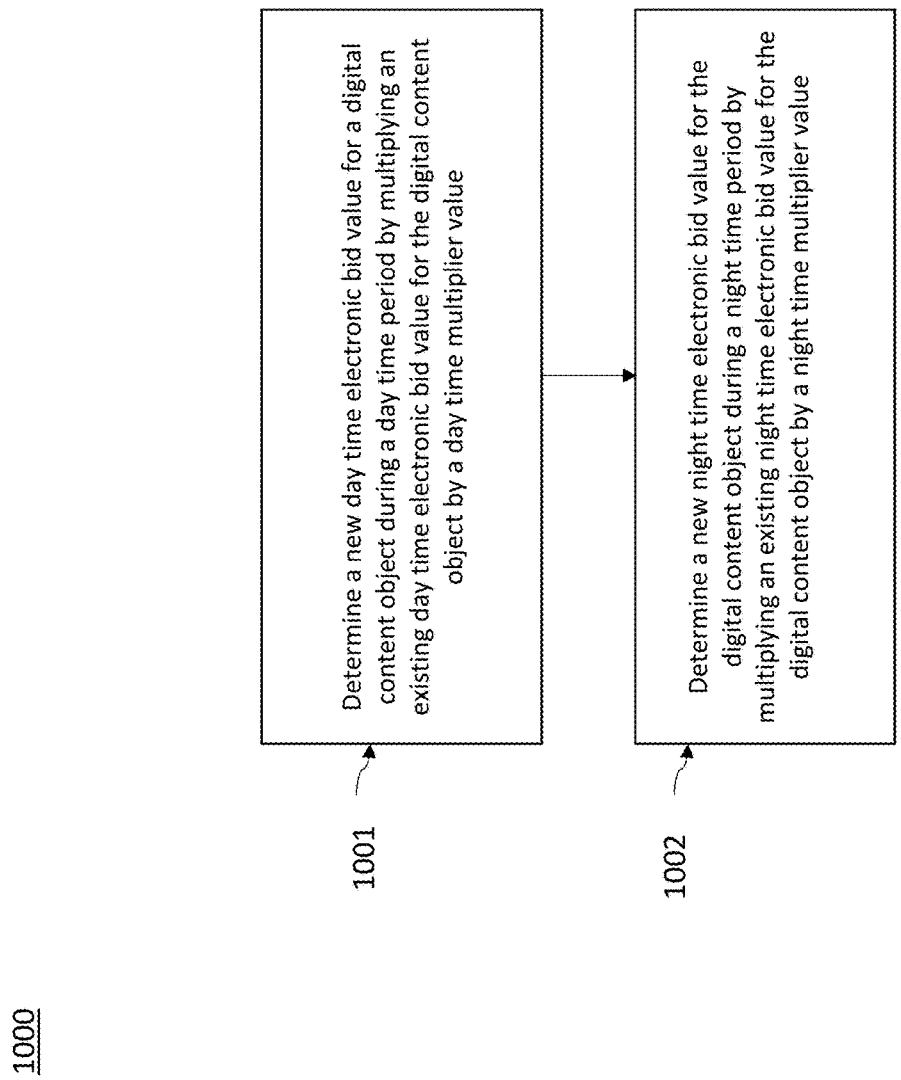

Having thus described the disclosure in general terms, reference will now be made to the accompanying drawings, which are not necessarily drawn to scale, and wherein:

FIG. 1 is an exemplary logical design diagram of a system configured to practice embodiments of the present disclosure;

FIG. 2 illustrates an exemplary schematic diagram of a computing entity according to one embodiment of the present disclosure;

FIG. 3 illustrates an exemplary plurality of network time periods, each equally divided by multiple network time period segments, according to one embodiment of the present disclosure;

FIG. 4 illustrates an exemplary process for adjusting an electronic bid value according to one embodiment of the present disclosure;

FIG. 5 illustrates an exemplary plurality of network time period segments within a plurality of network time periods, where a subset of the plurality of network time period segments is associated with a day time period and another subset of the plurality of network time period segments is associated with a night time period, according to one embodiment of the present disclosure;

FIG. 6 illustrates an exemplary process for adjusting an electronic bid value during a day time period according to one embodiment of the present disclosure;

FIG. 7 illustrates an exemplary process for programmatically generating a day time multiplier value according to one embodiment of the present disclosure;

FIG. 8 illustrates an exemplary process for adjusting an electronic bid value during a night time period according to one embodiment of the present disclosure;

FIG. 9 illustrates and exemplary process for programmatically generating a night time multiplier value according to one embodiment of the present disclosure; and FIG. 10 illustrates an exemplary process for adjusting an electronic bid value of a digital content object based on multiplier values associated with different time periods according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to programmatically determining and adjusting electronic bid values for a digital content object based on different conversion rates during different time periods.

Embodiments of the present disclosure enable adjusting of (i.e., increase or decrease of) an electronic bid value for a digital content object during different network time segments or different time periods (e.g. a day time period and a night time period) in the context of search engine marketing or advertising (SEM) or display network marketing or advertising to increase interactions between a client device and digital content objects. A conversion rate associated with a particular network time period segment or a particular time period is programmatically generated based on a ratio of transaction signals to device rendered object interaction signals received during the particular network time period segment or the particular time period. Based on the conversion rate, the electronic bid value may be increased or decreased during the particular or future network time period segment or the particular or future time period.

Furthermore, multiplier values are introduced in embodiments of the present disclosure for dynamically determining an electronic bid value for a digital content object based on a conversion performance assessment associated with the digital content object during a particular network time period segment or a particular time period. In such embodiments, a new electronic bid value for a digital content object during a particular network time period segment or a particular time period may be determined by multiplying a multiplier value by an existing electronic bid value for the digital content object. In embodiments, the multiplier value is associated with the particular network time period segment or the particular time period.

When interactions with a digital content object vary over network time periods, programmatically determining the most effective electronic bid value to associate with a digital content object is a computationally intensive and difficult challenge. Too high of an electronic bid value for the digital content object during a network time period where interactions with the digital content object may be minimal is a waste of network resources. Too low of an electronic bid value for the digital content object during a network time period where interactions with the digital content object are potentially high results in an improper number of resources dedicated to allocating device rendered objects in a storage device. This results in an imbalance of data storage and unnecessary exhaustion of computing resources. The inventors have identified that dynamically adjusting electronic bid values has traditionally been resolved using complex models, where issues including waste of network resources and increase of computing time may be created.

The inventors have identified that the system resources and time allocated to such electronic bid value determination are easily exhausted and compromised as a result of these challenges. The inventors have determined that the ability to dynamically adjust electronic bid values for digital content objects, including for particular network time periods, would reduce the computing resources and time necessary to perform such electronic bid value generation.

With the present disclosure, dynamically adjusting electronic bid values may be accomplished using a reduced data set and a reduction in rigid computation, thereby saving storage space and computing time and power.

Definitions

As used herein, the terms "data," "content," "information," "digital content object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like. In embodiments, examples of digital content objects include keywords.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer, without limitation, to a client, customer, purchaser, shopper, user and the like who may be using a client device to receive and interact with a device rendered object.

The terms "client profile" or "user profile" refer to a collection of preferences, settings, configurations, client device identifiers, data, and information associated with a specific user. A profile refers therefore to the explicit digital representation of a person's identity and other data or information associated with the user. In some embodiments, a client profile can be used to store a description of characteristics of the user and/or of the client device, as well as credentials, past behaviors, and preferences of the user.

The term "search query" refers to a query for electronic documents or digital content items submitted to a platform by a user utilizing a client device. The term "search results" refers to results returned from such a query. In some examples, a user using the client device may submit a query for "Japanese food" into an interface and the system may return a list of device rendered objects and/or URLs having keywords, metadata, or the like contained therein or associated therewith. The search results thus include the returned list of device rendered objects, all keywords and metadata associated therewith, and an arrangement or ranked order of the returned list.

The term "device rendered object" may be used to refer to a set of executable instructions that, when executed by a processor of a computing device, renders an object for display. An example of a device rendered object can be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data indicating one or more categories (such as a restaurant promotion, a spa promotion, a travel promotion, a local promotion, etc.), sub-categories (such as a sushi restaurant), location, hyper-locations, prices or the like. For example, an object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

In the present embodiments, device rendered objects may have associated therewith one or more attributes. It should be understood that each of the attributes discussed in this application, may be in some embodiments a primary or a secondary attribute. A list of exemplary attributes is provided below.

In some implementations, one attribute may represent category data, specifically beauty, wellness and healthcare. To determine a normalized value of the one attribute, an algorithm may be executed on associated raw data related to a device rendered object transaction. For example, if the category data associated with a device rendered object transaction is "beauty, wellness and healthcare," the value of the one attribute is 1. If the category data associated with a device rendered object transaction is not "beauty, wellness and healthcare," the value of the one attribute is 0.

In some embodiments, a number of example attributes relate to category data and sub-category data. There is also a number of attributes related to location data. It should be understood that attribute data related to location and hyper location data may be generated in a similar fashion. For example, if the location data associated with a device rendered object transaction is "Chicago," the value of a corresponding attribute may be 1. If the category data associated with a device rendered object transaction is not "Chicago," the value of the corresponding attribute may be 0.

It should also be understood that device rendered object transactions may have associated data indicating one or more categories, sub-categories, location, hyper-locations, prices or the like. For example, a device rendered object transaction may be associated with a gym, and the gym may be associated with category data such as "beauty, wellness, and healthcare," "Food and drink," "Leisure Offers and Activities" and/or "Services." A gym may also have more than one location, and may be able to provide promotions in a variety of price ranges and time frames.

Example attribute data can also be associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider of a promotional transaction. For example, device rendered object transactions purchased from providers from different locations (e.g., different countries, states, neighborhoods or the like) may be associated with different attribute data. For example, different countries have different credit reporting rules and agencies. Thus, a promotion and marketing system may utilize a first combination of attributes for a device rendered object transaction from a provider in a first location, hyper-location, category or sub-category and a second combination of attributes for a device rendered object transaction from provider in a second location, hyper-location, category or sub-category.

In one implementation, other attribute data may be used. For example, attribute "bad month" may relate to identifying device rendered object transactions associated with booking months where prior device rendered object transactions have involved products, services, and/or other offerings in one or more categories categorized as having high return rates based on prior performance data. The feature may be normalized such that if the sub-category of the device rendered object transaction is associated with high return rates, the attribute is 1, else the attribute is 0. Other example attributes are "bad market," which may be normalized such that if the device rendered object transaction requires travel to a location and/or hyper local region associated with high return rates, the attribute is 1, else the attribute is 0. Another example feature is "average price for sub-category."

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to device rendered object transaction associated with a merchant providing a service, attributes specifying past performance data can be for (1) the same merchant and the same service, (2) only the same merchant, (3) only the same service may be clustered under attribute header "past performance." Table A shows example attributes.

TABLE A

| Type | Features |
| --- | --- |
| Location | division, distance to city, etc. |
| past performance | same merchant & service, same service, same merchant, etc. |
| category & service | service header, primary deal service, etc. |
| booking month | holiday, pre-holiday, etc. |
| maximum capacity | units_avail, etc. |
| hero score | predicted 30 day bookings, predicted 60 day bookings, etc. |
| review data | yelp_n_review, yelp_rating, yelp_avil, google_n_review, facebook_fans, etc. |

The clustered or the non-clustered attributes may be used to train a machine learning model. It should be understood that the selection of attributes or clusters of attributes for training machine learning models can greatly affect the model performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In embodiments, each attribute selection approach may give a subset of significant attributes. The attributes that are not shown to be significant by one or more of the attribute selection approaches may be excluded from the model.

As used herein, the term "device rendered object service" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the device rendered object service, as some merchants or providers may utilize the device rendered object service only for the purpose of gathering client profile information, vector activity information, similarity table information, or the like.

The term "device rendered object interaction" refers to electronic interaction with a device rendered object by a client device. In some examples, the device rendered object interaction may take the form of an accessing or selection of the device rendered object, a viewing of the device rendered object on an electronic display, a scrolling over the device rendered object, a retrieval of the device rendered object, a purchase transaction completed for the device rendered object, and/or the like.

In some embodiments, the interaction data (e.g., device rendered object interaction data) may include various other interactions, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

The term "device rendered object interaction signal" refers to electronic indication that an interaction as defined above has occurred with respect to a particular device rendered object.

It should be appreciated that the term "programmatically expected" indicates machine prediction of occurrence of certain events.

The term "search engine electronic advertisement" refers to a digital advertisement for placement on a search engine page. In embodiments, a search engine electronic advertisement has associated therewith one or more digital content objects.

As used herein, the term "likelihood" refers to a measure of probability for occurrence of a particular event. For example, the likelihood that a client device will interact with a device rendered object may be a value associated with a specific scale. In some implementations, the machine predictions discussed above and below are based, at least in part, on the "likelihood" that an event will occur. Similarly, in some implementations, machine predictions are based on attributes associated with a client profile and/or an associated device rendered object.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

As used herein, the term "keyword" refers to a search term, word, or phrase that are selected to be rendered as part of a search engine results interface displayed on a graphical user interface of a client device. Content related to the search terms, words, or phrases are rendered for display to a user using a client device whenever the user enters the keyword into a search engine interface (e.g. Google, Bing, Yahoo, Baidu, and the like) via the client device. The keyword may describe or be associated with device rendered objects provided by a device rendered object service. The keyword may be selected by the device rendered object service as a digital content object for which to submit an electronic bid value for search engine marketing to help determine when and where content provided by the device rendered object service may appear on a search engine results page displayed on a graphical user interface for a user using a client device.

As used herein, the term "electronic bid value" refers to a digital representation of an amount of currency a device rendered object service is willing to have deducted from a currency account for a keyword each time a user searches the keyword as described above and interacts, via a client device, with content provided by the device rendered object service that is associated with the keyword.

As used herein, the term "network time period" refers to an electronically recorded period of time determined by a start timestamp and a finish timestamp, which are defined below. In one example, a network time period may be a 24-hour period determined by a time difference between a finish time and a start time, where the finish time is recorded by a finish timestamp and the start time is recorded by a start timestamp.

As used herein, the term "timestamp" refers to one or more items of data including an electronic record of the network time of occurrence of a particular event. As used herein, the term "start timestamp" refers to an electronic record of the starting time of a network time period. As used herein, the term "finish timestamp" refers to an electronic record of the ending time of a network time period. In the example of a 24-hour period as a network time period, a start timestamp may be an electronic record representing a starting time of the network time period as midnight 00:00 at a given date, where the starting time of the network time period may be associated with a geolocation and a time zone of a client device. In such an example, a finish timestamp may be an electronic record representing an ending time of the network time period as midnight 24:00 at the end of the given date, where the starting time of the network time period may be associated with the geolocation and the time zone of the client device.

As used herein, the term "network time period segment" refers to an electronically recorded sub-period of time dividing the network time period. In the example of a 24-hour period as a network time period, a segment may be a 1-hour period dividing the network time period into 24 segments.

As used herein, the term "transaction signal" refers to an electronic signal received by a server from a client device that is associated with a user profile, where the transaction signal indicates the client device associated with the user profile has completed a transaction with a device rendered object. The transaction signal may include information associated with the user profile that completed a transaction via the client device.

The term "conversion" refers to completion of a network transaction with a device rendered object presented by a device rendered object service as a result of a client device interacting with a device rendered object associated with a particular digital content object.

The term "conversion rate" refers to a metric for assessing the performance of a digital content object, where the metric is defined by a ratio of a total number of conversions (defined above) to a total number of client devices' interactions with the device rendered objects associated with the digital content object during the same time period. In embodiments, the conversion rate is programmatically generated by taking a total number of transaction signals received during a network time period segment and dividing that total number by a total number of device rendered object interaction signals received during the same network time period segment.

In embodiments, a "day time conversion rate" is programmatically generated by dividing a total number of transaction signals by a total number of device rendered object interaction signals received during a day time period within a network time period. Similarly, a "night time conversion rate" is programmatically generated by dividing a total number of transaction signals by a total number of device rendered object interaction signals received during a night time period within a network time period. In embodiments, a "network time period conversion rate" is programmatically generated by dividing a total number of transaction signals by a total number of device rendered object interaction signals received during a network time period.

The term "averaged conversion rate" refers to a mean value calculated by averaging a plurality of conversion rates during a same time period within different network time periods. In embodiments, the averaged conversion rate is programmatically generated by averaging a plurality of conversion rates during a network time period segment within different network time periods.

In embodiments, a "day time averaged conversion rate" is programmatically generated by averaging a plurality of day time conversion rates during a day time period within different network time periods. Similarly, a "night time averaged conversion rate" is programmatically generated by averaging a plurality of night time conversion rates during a night time period within different network time periods. In embodiments, a "network time period averaged conversion rate" is programmatically generated by averaging a plurality of network time period conversion rates associated with different network time periods.

The term "multiplier value" refers to a value programmatically generated by a server based at least on a particular averaged conversion rate (defined above) associated with a respective time period within different network time periods. In embodiments, a multiplier value is programmatically generated based on a particular averaged conversion rate associated a respective network time period segment within different network time periods. In embodiments, a "day time multiplier value" is programmatically generated based on a particular day time averaged conversion rate associated with a respective day time period within different network time periods, as well as a network time period averaged conversion rate associated with different network time periods. Similarly, a "night time multiplier value" is programmatically generated based on a particular night time averaged conversion rate associated with a respective night time period within different network time periods, as well as a network time period averaged conversion rate associated with different network time periods.

The term "conversion performance assessment" refers to an assessment of the performance of a digital content object during a respective network time period segment, where the conversion performance assessment is associated with a respective multiplier value generated based on an averaged conversion rate associated with the respective network time period within different network time periods. In embodiments, a large multiplier value may be generated based on a large averaged conversion rate indicating the digital content object performs well during a particular network time period segment. In embodiments, a small multiplier value may be generated based on a small averaged conversion rate indicating the digital content object performs badly during a particular network time period segment.

The term "geolocation data" refers to one or more items of electronic data that may represent a geographic location of a device rendered object by numerical values in a geographic coordinate system. In embodiments, a geolocation data may be GPS coordinates that may be represented by latitude and longitude or a combination of latitude and longitude. In such embodiments, the geolocation data may be associated with a device rendered object and the geolocation data may provide information to identify a precise geographic location of a provider or merchant associated with the device rendered object.

The term "day time period" refers to a time period between sunrise and sunset when there is daylight, where the day time period is associated with geolocation data of a device rendered object or a time zone where a device rendered object is located in.

The term "night time period" refers to a time period between evening and morning when there is no daylight, where the night time period is associated with geolocation data of a device rendered object or a time zone where a device rendered object is located in.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Example System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present invention may operate. Client devices may access a device rendered object system 115 via a communications network 102 (e.g., the Internet, LAN, WAN, or the like) using client devices 101A-101N. The device rendered object system 115 may comprise a server 107 in communication with one or more databases or repositories 108-112.

The server 107 may be embodied as a computer or computers as known in the art. The server 107 may provide for receiving of electronic data from various sources, including but not necessarily limited to the client devices 101A-101N. For example, the server 107 may be operable to receive transaction signals and device rendered object interaction signals transmitted by the client devices 101A-101N. The server 107 may facilitate the generation and providing of various search results comprising digital content objects.

The databases or repositories 108-112 may be embodied as a data storage device such as a Network Attached Storage (NAS) device or devices, or as a separate database server or servers. The databases 108-112 include information accessed and stored by the server 107 to facilitate the operations of the device rendered object system 115. For example, the databases 108-112 may include, without limitation, client profiles for users of the system 115, conversion rates, multiplier values, digital content objects and associated features/attributes, device rendered objects and associated features/attributes, electronic bid values for different digital content objects, and/or the like.

Device rendered object repository 112 may include one or more device rendered objects and associated features/attributes to facilitate the operations of the device rendered object system 115.

Digital content object repository 111 may include one or more digital content objects and associated features/attributes to facilitate the operations of the device rendered object system 115.

Electronic bid value repository 110 may include mappings of each electronic bid value and each network time period segment or each time period associated with a digital content object.

Multiplier value repository 109 may include one or more multiplier values each representing a conversion performance assessment of a digital content object during a particular network time period segment or a particular time period (e.g., a day time period or a night time period) associated with a particular conversion rate.

Conversion rate repository 108 may include one or more values associated with each network time period segment or each time period (e.g., a day time period or a night time period), where each conversion rate is programmatically generated based on dividing a total number of received transaction signals by a total number of received device rendered object interaction signals during each network time period segment or each time period (e.g., a day time period or a night time period).

The server 107 may comprise a conversion rate generator 104 that is configured to generate conversion rates for digital content objects during different network time period segments or different time periods (e.g., a day time period and a night time period) as defined above. The server 107 may further comprise a multiplier value generator 105 for generating multiplier values for digital content objects during different network time period segments or different time periods (e.g., a day time period and a night time period) as defined above. The server 107 may further comprise an electronic bid value generator 106 for generating electronic bid values for digital content objects during different network time period segments or different time periods (e.g., a day time period and a night time period) as defined above.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the system 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the system 115 and/or the search engine provider 103 via a web browser. As yet another example, the client device 101A-101N may include various hardware or firmware designed to interface with the system 115 and/or the search engine provider 103.

It will be appreciated that repositories 108-112 may be one or more repositories, and may be part of or separate from server 107.

Example Apparatus for Implementing Embodiments of the Present Invention

The server 107 may be embodied by one or more computing systems, such as apparatus 200 shown in FIG. 2. The apparatus 200 may include a processor 202, a memory 201, input/output circuitry 204, communications circuitry 205, and digital content object electronic bid value generation circuitry 203. The apparatus 200 may be configured to execute the operations described herein. Although these components 201-205 are described with respect to functional limitations, it should be understood that the particular implementations necessarily include the use of particular hardware. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Digital content object electronic bid value generation circuitry 203 includes hardware configured to programmatically generate electronic bid values for digital content objects. The digital content object electronic bid value generation circuitry 203 may utilize processing circuitry, such as the processor 202, to perform these actions. However, it should also be appreciated that, in some embodiments, the digital content object electronic bid value generation circuitry 203 may include a separate processor, specially configured field programmable gate array (FPGA), or application specific interface circuit (ASIC) for performing the functions described herein. The digital content object electronic bid value generation circuitry 203 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Programmatically
Generating and Adjusting Electronic Bid Values for
Digital Content Objects Based on Conversion Rates FIG. 3 illustrates an exemplary plurality of network time periods, each equally divided by multiple network time period segments according to one embodiment of the present disclosure. The exemplary network time period 300 is associated with a start timestamp and a finish timestamp. In embodiments, the exemplary network time period 300 may be a 24-hour period determined by a time difference between the start timestamp and the finish timestamp. In such embodiments, the exemplary network time period 300 may be divided by 24 network time period segments, where each network time period segment is a 1-hour period. Furthermore, a conversion rate may be programmatically generated for each network time period segment based on a total number of transaction signals and a total number of device rendered object interaction signals received during a particular network time period segment within the network time period 300.

FIG. 4 illustrates an exemplary process for adjusting an electronic bid value according to one embodiment of the present disclosure.

The method 400 begins with receiving, from a plurality of client devices, a plurality of transaction signals associated with a plurality of device rendered objects 401. In embodiments, the plurality of device rendered objects are associated with a digital content object. In embodiments, the digital content object is a keyword.

The method 400 continues with receiving, from the plurality of client devices, a plurality of device rendered object interaction signals associated with the plurality of device rendered objects 402.

The method 400 continues with programmatically generating a first set of conversion rates, where each conversion rate of the first set of conversion rates is associated with a different one of the plurality of network time period segments within a first network time period 403. In embodiments, each conversion rate of the first set of conversion rates is programmatically generated based on dividing a total number of the plurality of transaction signals by a total number of the plurality of device rendered object interaction signals received during each of the plurality of network time period segments within the first network time period. In embodiments, each of the plurality of network time periods is associated with a start timestamp and a finish timestamp. In embodiments, a time period between the start timestamp and the finish timestamp is 24-hours and each of the plurality of network time period segments dividing the one or more network time periods is a 1-hour period.

The method 400 continues with programmatically generating a second set of conversion rates, where each conversion rate of the second set of conversion rates is associated with a different one of the plurality of network time period segments within a second network time period 404. In embodiments, each conversion rate of the second set of conversion rates is programmatically generated based on dividing a total number of the plurality of transaction signals by a total number of the plurality of device rendered object interaction signals received during each of the plurality of network time period segments within the second network time period.

The method 400 continues with generating an averaged conversion rate for each of the plurality of network time period segments based on averaging the first set of conversion rates for each of the plurality of network time period segments within the first network time period and the second set of conversion rates for each of the plurality of network time period segments within the second network time period 405.

The method 400 continues with programmatically generating a multiplier value based on the averaged conversion rate for each of the plurality of network time period segments 406. In embodiments, the multiplier value is associated with a particular network time period segment of the plurality of network time period segments and indicates a conversion performance assessment of the digital content object during the particular network time period segment.

The method 400 continues with programmatically adjusting the electronic bid value of the digital content object during the particular network time period segment based at least on the multiplier value 407.

FIG. 5 illustrates an exemplary plurality of network time period segments within a plurality of network time periods, where a subset of the plurality of network time period segments is associated with a day time period and another subset of the plurality of network time period segments is associated with a night time period, according to one embodiment of the present disclosure. The exemplary network time period 500 is associated with a start timestamp and a finish timestamp. In embodiments, the exemplary network time period 500 may be a 24-hour period determined by a time difference between the start timestamp and the finish timestamp. In such embodiments, the exemplary network time period 500 may be divided by 24 network time period segments, where each network time period segment is a 1-hour period.

In such embodiments, a subset of the plurality of network time period segments is associated with a day time period and another subset of the plurality of network time period segments is associated with a night time period. In such embodiments, the day time period and the night time periods may be determined based on geolocation data associated with a plurality of device rendered objects. In embodiments, the seventh network time period segment to the eighteenth network time period segment (representing a local time of 6 am-6 pm) may be associated with a day time period. In embodiments, the first network time period segment to the sixth network time period (representing a local time of 12 am-6 am) and the nineteenth network time period segment to the twenty-fourth network time period segment (representing a local time of 6 pm-12 pm) may be associated with a night time period. Furthermore, a day time conversion rate may be programmatically generated for the day time period based on a total number of transaction signals and a total number of device rendered object interaction signals received during the day time period within the network time period 500. In embodiments, a night time conversion rate may be programmatically generated for the night time period based on a total number of transaction signals and a total number of device rendered object interaction signals received during the night time period within the network time period 500.

FIG. 6 illustrates an exemplary process for adjusting an electronic bid value during a day time period according to one embodiment of the present disclosure.

In embodiments, each of the plurality of network time periods is divided equally by the plurality of network time period segments, where a subset of the plurality of network time period segments is associated with a day time period and another subset of the plurality of network time period segments is associated with a night time period. In such embodiments, the day time period and the night time period is determined based on geolocation data associated with the plurality of device rendered objects.

The method 600 begins with programmatically generating a first day time conversion rate associated with a subset of the plurality of network time period segments 601. In embodiments, the first day time conversion rate is programmatically generated based on dividing a total number of a plurality of transaction signals by a total number of a plurality of device rendered object interaction signals received during a day time period within a first network time period.

The method 600 continues with programmatically generating a second day time conversion rate associated with the subset of the plurality of network time period segments 602. In embodiments, the second day time conversion rate is programmatically generated based on dividing a total number of a plurality of transaction signals by a total number of a plurality of device rendered object interaction signals received during the day time period within a second network time period.

The method 600 continues with programmatically generating a day time averaged conversion rate for the day time period based on averaging the first day time conversion rate and the second day time conversion rate 603.

The method 600 continues with programmatically generating a first network time period conversion rate based on dividing a total number of the plurality of transaction signals by a total number of the plurality of device rendered object interaction signals received within the first network time period 604.

The method 600 continues with programmatically generating a second network time period conversion rate based on dividing a total number of the plurality of transaction signals by a total number of the plurality of device rendered object interaction signals received within the second network time period 605.

The method 600 continues with programmatically generate a network time period averaged conversion rate based on averaging the first network time period conversion rate and the second network time period conversion rate 606.

The method 600 continues with programmatically generating a day time multiplier value based on the day time averaged conversion rate and the network time period averaged conversion rate 607. In embodiments, the day time multiplier value is associated with the day time period and indicates a conversion performance assessment of the digital content object during the day time period.

The method 600 continues with programmatically adjusting the electronic bid value of the digital content object during the day time period based at least on the day time multiplier value 608.

FIG. 7 illustrates an exemplary process for programmatically generating a day time multiplier value according to one embodiment of the present disclosure.

The method 700 begins with programmatically generating the day time multiplier value based on dividing the day time averaged conversion rate by the network time period averaged conversion rate 701. In circumstances where the day time multiplier value is larger than 1.5 (702), the method 700 continues with programmatically adjusting the day time multiplier value to be 1.5 (703). In circumstances where the day time multiplier value is smaller than 0.5 (704), the method 700 continues with programmatically adjusting the day time multiplier value to be 0.5 (705).

FIG. 8 illustrates an exemplary process for adjusting an electronic bid value during a night time period according to one embodiment of the present disclosure.

In embodiments, each of the plurality of network time periods is divided equally by the plurality of network time period segments, where a subset of the plurality of network time period segments is associated with a day time period and another subset of the plurality of network time period segments is associated with a night time period. In such embodiments, the day time period and the night time period is determined based on geolocation data associated with the plurality of device rendered objects.

The method 800 begins with programmatically generating a first night time conversion rate associated with another subset of the plurality of network time period segments 801. In embodiments, the first night time conversion rate is programmatically generated based on dividing a total number of a plurality of transaction signals by a total number of a plurality of device rendered object interaction signals received during a night time period within a first network time period.

The method 800 continues with programmatically generating a second night time conversion rate associated with another subset of the plurality of network time period segments 802. In embodiments, the second night time conversion rate is programmatically generated based on dividing a total number of a plurality of transaction signals by a total number of a plurality of device rendered object interaction signals received during the night time period within a second network time period.

The method 800 continues with generating a night time averaged conversion rate for the night time period based on averaging the first night time conversion rate and the second night time conversion rate 803.

The method 800 continues with programmatically generating a night time multiplier value based on the night time averaged conversion rate and the network time period averaged conversion rate 804. In embodiments, the night time multiplier value is associated with the night time period and indicates a conversion performance assessment of the digital content object during the night time period.

The method 800 continues with programmatically adjusting the electronic bid value of the digital content object during the night time period based at least on the night time multiplier value 805.

FIG. 9 illustrates an exemplary process for programmatically generating a night time multiplier value according to one embodiment of the present disclosure.

The method 900 begins with programmatically generating the night time multiplier value based on dividing the night time averaged conversion rate by the network time period averaged conversion rate 901. In circumstances where the night time multiplier value is larger than 1.5 (902), the method 900 continues with programmatically adjusting the night time multiplier value to be 1.5 (903). In circumstances where the night time multiplier value is smaller than 0.5 (904), the method 900 continues with programmatically adjusting the night time multiplier value to be 0.5 (905).

FIG. 10 illustrates an exemplary process for adjusting an electronic bid value of a digital content object based on multiplier values associated with different time periods according to one embodiment of the present disclosure.

The method 1000 begins with determining a new day time electronic bid value for a digital content object during a day time period by multiplying an existing day time electronic bid value for the digital content object by a day time multiplier value 1001.

The method 1000 continues with determining a new night time electronic bid value for a digital content object during a night time period by multiplying an existing night time electronic bid value for the digital content object by a night time multiplier value 1002.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for adjusting an electronic bid value for a digital content object based on a plurality of network time period segments within a plurality of network time periods, wherein each of the plurality of network time periods is divided equally by the plurality of network time period segments, the apparatus comprising at least one processor and at least one memory including computer program code, the at least one memory and the computer program code configured to, with the at least one processor, cause the apparatus to:

receive, from a plurality of client devices, a plurality of transaction signals associated with a plurality of device rendered objects, wherein the plurality of device rendered objects are associated with the digital content object, wherein each transaction signal of the plurality of transaction signals represents a completion of a transaction between one or more client devices of the plurality of client devices and one or more device rendered objects of the plurality of device rendered objects in response to a first rendering of the one or more device rendered objects via an interface of the one or more client devices;

receive, from the plurality of client devices, a plurality of device rendered object interaction signals associated with the plurality of device rendered objects, wherein each device rendered object interaction signal of the plurality of device rendered object interaction signals represents one or more electronic interactions performed by one or more client devices of the plurality of client devices with content associated with the digital content object in response to a second rendering of the content via the interface of the one or more client devices;

programmatically generate a first day time conversion rate associated with the subset of the plurality of network time period segments within a first network time period of the plurality of network time periods, wherein a subset of the plurality of network time period segments for a respective time period of the plurality of network time periods is associated with a day time period, and wherein the first day time conversion rate is programmatically generated based on dividing a total number of the plurality of transaction signals by a total number of the plurality of device rendered object interaction signals received during the day time period within the first network time period;

programmatically generate a second day time conversion rate associated with the subset of the plurality of network time period segments, wherein the second day time conversion rate is programmatically generated based on dividing a total number of the plurality of transaction signals by a total number of the plurality of device rendered object interaction signals received during the day time period within the second network time period;

programmatically generate a day time averaged conversion rate for each of the plurality of network time period segments based on averaging the first day time conversion rate for the subset of the plurality of network time period segments within the first network time period and the second day time conversion rate for each of the plurality of network time period segments within the second network time period;

programmatically generate a first network time period conversion rate based on dividing a total number of the plurality of transaction signals by a total number of the plurality of device rendered object interaction signals received within the first network time period;

programmatically generate a second network time period conversion rate based on dividing a total number of the plurality of transaction signals by a total number of the plurality of device rendered object interaction signals received within the second network time period;

programmatically generate a network time period averaged conversion rate based on averaging the first network time period conversion rate and the second network time period conversion rate;

programmatically generate a day time multiplier value based on the day time averaged conversion rate and the network time period averaged conversion rate, wherein the day time multiplier value is associated with the day time period and indicates a conversion performance assessment of the digital content object during the day time period; and programmatically adjust the electronic bid value for the digital content object during the day time period based at least on the day time multiplier value.

2. The apparatus of claim 1, wherein a subset of the plurality of network time period segments for a respective time period of the plurality of network time periods is associated with a night time period.

3. The apparatus of claim 2, wherein the day time period and the night time period is determined based on geolocation data associated with the plurality of device rendered objects.

4. The apparatus of claim 1, wherein the at least one processor and the at least one memory including the computer program code, the at least one memory and the computer program code configured to, with the at least one processor, further cause the apparatus to:

programmatically generate the day time multiplier value based on dividing the day time averaged conversion rate by the network time period averaged conversion rate;

in circumstances where the day time multiplier value is larger than 1.5:
programmatically adjust the day time multiplier value to be 1.5; and in circumstances where the day time multiplier value is smaller than 0.5:
programmatically adjust the day time multiplier value to be 0.5.

5. The apparatus of claim 2, wherein the at least one processor and the at least one memory including the computer program code, the at least one memory and the computer program code configured to, with the at least one processor, further cause the apparatus to:

programmatically generate a first night time conversion rate associated with the another subset of the plurality of network time period segments, wherein the first night time conversion rate is programmatically generated based on dividing a total number of the plurality of transaction signals by a total number of the plurality of device rendered object interaction signals received during the night time period within the first network time period;

programmatically generate a second night time conversion rate associated with the another subset of the plurality of network time period segments, wherein the second night time conversion rate is programmatically generated based on dividing a total number of the plurality of transaction signals by a total number of the plurality of device rendered object interaction signals received during the night time period within the second network time period;

programmatically generate a night time averaged conversion rate for the night time period based on averaging the first night time conversion rate and the second night time conversion rate;

programmatically generate a night time multiplier value based on the night time averaged conversion rate and the network time period averaged conversion rate, wherein the night time multiplier value is associated with the night time period and indicates a conversion performance assessment of the digital content object during the night time period; and programmatically adjust the electronic bid value of the digital content object during the night time period based at least on the night time multiplier value.

6. The apparatus of claim 5, wherein the at least one processor and the at least one memory including the computer program code, the at least one memory and the computer program code configured to, with the at least one processor, further cause the apparatus to:

programmatically generate the night time multiplier value based on dividing the night time averaged conversion rate by the network time period averaged conversion rate;

in circumstances where the night time multiplier value is larger than 1.5:
programmatically adjust the night time multiplier value to be 1.5; and in circumstances where the night time multiplier value is smaller than 0.5:
programmatically adjust the night time multiplier value to be 0.5.

7. The apparatus of claim 6, wherein the at least one processor and the at least one memory including the computer program code, the at least one memory and the computer program code configured to, with the at least one processor, further cause the apparatus to:

determine a new day time electronic bid value for the digital content object during the day time period by multiplying an existing day time electronic bid value for the digital content object by the day time multiplier value; and determine a new night time electronic bid value for the digital content object during the night time period by multiplying an existing night time electronic bid value for the digital content object by the night time multiplier value.

8. The apparatus of claim 1, wherein each of the plurality of network time periods is associated with a start timestamp and a finish timestamp.

9. The apparatus of claim 8, wherein a time period between the start timestamp and the finish timestamp is 24-hours.

10. The apparatus of claim 1, wherein each of the plurality of network time period segments dividing the plurality of network time periods is a 1-hour period.

11. A method for adjusting an electronic bid value for a digital content object based on a plurality of network time period segments within a plurality of network time periods, wherein each of the plurality of network time periods is divided equally by the plurality of network time period segments, the method comprising:

receiving, from a plurality of client devices, a plurality of transaction signals associated with a plurality of device rendered objects, wherein the plurality of device rendered objects are associated with the digital content object, wherein each transaction signal of the plurality of transaction signals represents a completion of a transaction between one or more client devices of the plurality of client devices and one or more device rendered objects of the plurality of device rendered objects in response to a first rendering of the one or more device rendered objects via an interface of the one or more client devices;

receiving, from the plurality of client devices, a plurality of device rendered object interaction signals associated with the plurality of device rendered objects, wherein each device rendered object interaction signal of the plurality of device rendered object interaction signals represents one or more electronic interactions performed by one or more client devices of the plurality of client devices with content associated with the digital content object in response to a second rendering of the content via the interface of the one or more client devices;

programmatically generating a first day time conversion rate associated with the subset of the plurality of network time period segments within a first network time period of the plurality of network time periods, wherein a subset of the plurality of network time period segments for a respective time period of network time periods is associated with a day time period, and wherein the first day time conversion rate is programmatically generated based on dividing a total number of the plurality of transaction signals by a total number of the plurality of device rendered object interaction signals received during the day time period within the first network time period;

programmatically generating a second day time conversion rate associated with the subset of the plurality of network time period segments, wherein the second day time conversion rate is programmatically generated based on dividing a total number of the plurality of transaction signals by a total number of the plurality of device rendered object interaction signals received during the day time period within the second network time period;

programmatically generating a day time averaged conversion rate for each of the plurality of network time period segments based on averaging the first day time conversion rate for the subset of the plurality of network time period segments within the first network time period and the second day time conversion rate for each of the plurality of network time period segments within the second network time period;

programmatically generating a first network time period conversion rate based on dividing a total number of the plurality of transaction signals by a total number of the plurality of device rendered object interaction signals received within the first network time period;

programmatically generating a second network time period conversion rate based on dividing a total number of the plurality of transaction signals by a total number of the plurality of device rendered object interaction signals received within the second network time period;

programmatically generating a network time period averaged conversion rate based on averaging the first network time period conversion rate and the second network time period conversion rate;

programmatically generating a day time multiplier value based on the day time averaged conversion rate and the network time period averaged conversion rate, wherein the day time multiplier value is associated with the day time period and indicates a conversion performance assessment of the digital content object during the day time period; and programmatically adjusting the electronic bid value for the digital content object during the day time period based at least on the day time multiplier value.

12. The method of claim 11, wherein a subset of the plurality of network time period segments for a respective time period of the plurality of network time periods is associated with a night time period.

13. The method of claim 12, wherein the day time period and the night time period is determined based on geolocation data associated with the plurality of device rendered objects.

14. The method of claim 11, further comprising:
programmatically generating the day time multiplier value based on dividing the day time averaged conversion rate by the network time period averaged conversion rate;
in circumstances where the day time multiplier value is larger than 1.5:
programmatically adjust the day time multiplier value to be 1.5; and
in circumstances where the day time multiplier value is smaller than 0.5:
programmatically adjust the day time multiplier value to be 0.5.

15. The method of claim 12 further comprising:
programmatically generating a first night time conversion rate associated with the another subset of the plurality of network time period segments, wherein the first night time conversion rate is programmatically generated based on dividing a total number of the plurality of transaction signals by a total number of the plurality of device rendered object interaction signals received during the night time period within the first network time period;
programmatically generating a second night time conversion rate associated with the another subset of the plurality of network time period segments, wherein the second night time conversion rate is programmatically generated based on dividing a total number of the plurality of transaction signals by a total number of the plurality of device rendered object interaction signals received during the night time period within the second network time period;
programmatically generating a night time averaged conversion rate for the night time period based on averaging the first night time conversion rate and the second night time conversion rate;
programmatically generating a night time multiplier value based on the night time averaged conversion rate and the network time period averaged conversion rate, wherein the night time multiplier value is associated with the night time period and indicates a conversion performance assessment of the digital content object during the night time period; and
programmatically adjusting the electronic bid value of the digital content object during the night time period based at least on the night time multiplier value.

16. The method of claim 15, further comprising:
programmatically generating the night time multiplier value based on dividing the night time averaged conversion rate by the network time period averaged conversion rate;
in circumstances where the night time multiplier value is larger than 1.5:
programmatically adjust the night time multiplier value to be 1.5; and
in circumstances where the night time multiplier value is smaller than 0.5:
programmatically adjust the night time multiplier value to be 0.5.

17. The method of claim 16, further comprising:
determining a new day time electronic bid value for the digital content object during the day time period by multiplying an existing day time electronic bid value for the digital content object by the day time multiplier value; and
determining a new night time electronic bid value for the digital content object during the night time period by multiplying an existing night time electronic bid value for the digital content object by the night time multiplier value.

18. The method of claim 11, wherein each of the plurality of network time periods is associated with a start timestamp and a finish timestamp.

19. The method of claim 18, wherein a time period between the start timestamp and the finish timestamp is 24-hours.

20. The method of claim 11, wherein each of the plurality of network time period segments dividing the plurality of network time periods is a 1-hour period.

21. A system for adjusting an electronic bid value for a digital content object based on a plurality of network time period segments within a plurality of network time periods, wherein each of the plurality of network time periods is divided equally by the plurality of network time period segments, the system comprising at least one repository and at least one server comprising at least one processor and at least one memory including computer program code, the at least one memory and the computer program code configured to, with the at least one processor, cause the system to:
receive, from a plurality of client devices, a plurality of transaction signals associated with a plurality of device rendered objects, wherein the plurality of device rendered objects are associated with the digital content object, wherein each transaction signal of the plurality of transaction signals represents a completion of a transaction between one or more client devices of the plurality of client devices and one or more device rendered objects of the plurality of device rendered objects in response to a first rendering of the one or more device rendered objects via an interface of the one or more client devices;
receive, from the plurality of client devices, a plurality of device rendered object interaction signals associated with the plurality of device rendered objects, wherein each device rendered object interaction signal of the plurality of device rendered object interaction signals represents one or more electronic interactions performed by one or more client devices of the plurality of client devices with content associated with the digital content object in response to a second rendering of the content via the interface of the one or more client devices;
programmatically generate a first day time conversion rate associated with the subset of the plurality of network time period segments within a first network time period of the plurality of network time periods, wherein a subset of the plurality of network time period segment for a respective time period of the plurality of network time periods is associated with a day time period, and wherein the first day time conversion rate is programmatically generated based on dividing a total number of the plurality of transaction signals by a total number of the plurality of device rendered object interaction signals received during the day time period within the first network time period;
programmatically generate a second day time conversion rate associated with the subset of the plurality of network time period segments, wherein the second day time conversion rate is programmatically generated based on dividing a total number of the plurality of transaction signals by a total number of the plurality of device rendered object interaction signals received during the day time period within the second network time period;

programmatically generate a day time averaged conversion rate for each of the plurality of network time period segments based on averaging the first day time conversion rate for the subset of the plurality of network time period segments within the first network time period and the second day time conversion rate for each of the plurality of network time period segments within the second network time period;

programmatically generate a first network time period conversion rate based on dividing a total number of the plurality of transaction signals by a total number of the plurality of device rendered object interaction signals received within the first network time period;

programmatically generate a second network time period conversion rate based on dividing a total number of the plurality of transaction signals by a total number of the plurality of device rendered object interaction signals received within the second network time period;

programmatically generate a network time period averaged conversion rate based on averaging the first network time period conversion rate and the second network time period conversion rate;

programmatically generate a day time multiplier value based on the day time averaged conversion rate and the network time period averaged conversion rate, wherein the day time multiplier value is associated with the day time period and indicates a conversion performance assessment of the digital content object during the day time period; and programmatically adjust the electronic bid value for the digital content object during the day time period based at least on the da time multiplier value.

* * * * *

UNITED STATES PATENT AND TRADEMARK OFFICE
CERTIFICATE OF CORRECTION

PATENT NO. : 11,250,477 B1
APPLICATION NO. : 16/228532
DATED : February 15, 2022
INVENTOR(S) : Anand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this
Fourteenth Day of February, 2023

Katherine Kelly Vidal
*Director of the United States Patent and Trademark Office*